United States Patent
Daftardar

(10) Patent No.: US 7,206,973 B2
(45) Date of Patent: Apr. 17, 2007

(54) PCI VALIDATION

(75) Inventor: Jayant M. Daftardar, Norcross, GA (US)

(73) Assignee: LSI Logic Corporation, Milpitas, CA (US)

( * ) Notice: Subject to any disclaimer, the term of this patent is extended or adjusted under 35 U.S.C. 154(b) by 480 days.

(21) Appl. No.: 10/733,546

(22) Filed: Dec. 11, 2003

(65) Prior Publication Data

US 2005/0132110 A1 Jun. 16, 2005

(51) Int. Cl.
*G06F 11/00* (2006.01)
(52) U.S. Cl. .............................. 714/43; 714/44; 714/36
(58) Field of Classification Search ................ 714/43, 714/36, 44, 21
See application file for complete search history.

(56) References Cited

U.S. PATENT DOCUMENTS

| 5,705,938 | A | * | 1/1998 | Kean .......................... 326/39 |
| 5,737,235 | A | * | 4/1998 | Kean et al. .................. 716/16 |
| 5,754,796 | A | * | 5/1998 | Wang et al. ................ 710/301 |
| 5,890,204 | A | * | 3/1999 | Ofer et al. .................. 711/111 |
| 6,032,271 | A | * | 2/2000 | Goodrum et al. ............ 714/56 |
| 6,199,178 | B1 | * | 3/2001 | Schneider et al. ............ 714/21 |
| 6,401,220 | B1 | * | 6/2002 | Grey et al. ................... 714/33 |
| 7,007,203 | B2 | * | 2/2006 | Gorday et al. ................ 714/37 |
| 2002/0072391 | A1 | * | 6/2002 | Itoh et al. ................... 455/557 |
| 2003/0005190 | A1 | * | 1/2003 | Leete ......................... 710/52 |
| 2003/0046371 | A1 | * | 3/2003 | Falkner ...................... 709/220 |
| 2003/0182422 | A1 | * | 9/2003 | Bradshaw et al. .......... 709/225 |
| 2003/0200290 | A1 | * | 10/2003 | Zimmerman et al. ....... 709/222 |
| 2004/0049672 | A1 | * | 3/2004 | Nollet et al. ................ 713/100 |
| 2004/0123027 | A1 | * | 6/2004 | Workman et al. ........... 711/112 |
| 2004/0158668 | A1 | * | 8/2004 | Golasky et al. ............. 710/315 |
| 2005/0027702 | A1 | * | 2/2005 | Jensen et al. ................. 707/3 |
| 2005/0149650 | A1 | * | 7/2005 | Workman et al. ............. 710/38 |
| 2006/0037000 | A1 | * | 2/2006 | Speeter et al. .............. 717/120 |

OTHER PUBLICATIONS http://en.wikipedia.org/wiki/Windows_registry.*
Microsoft Computer Dictionary, Microsoft Press, May 1, 2002, 5th edition, .ini and registry.*

* cited by examiner

*Primary Examiner*—Scott Baderman
*Assistant Examiner*—Loan Truong
(74) *Attorney, Agent, or Firm*—Suiter Swantz PC LLO

(57) ABSTRACT

A method and system for validating host bus adapters uses two processing passes. In the first pass, a snapshot of all configuration values of selected peripheral devices is taken. Then, the host bus adapter is powered down for a predefined period of time and powered up again. In the second pass, all the configuration values of the selected peripheral devices are reinitialized in a recursive manner.

3 Claims, 4 Drawing Sheets

PCI VALIDATION

FIELD OF THE INVENTION

The present invention generally relates to the field of diagnostics of computer peripherals on a bus, and particularly to a method and system for validating a Peripheral Computer Interconnect (PCI) bus and associated peripheral devices, including Redundant Arrays of Independent Disks (RAIDs).

BACKGROUND OF THE INVENTION

Redundant Array of Independent Disk (RAID) adapters have on-board battery back up to guarantee data retention. A manufacturing diagnostic utility, such as RAIDDIAG™, is used to check and verify on-board battery logic in a Disk Operating System (DOS) environment. In order to do this, during test time, adapters are mounted on ADEX raiser cards that in turn are mounted on add-on PCI-PCIX slots in host machine. RAIDDIAG™ writes down known data patterns on adapter memory that is backed up with battery logic. Subsequently, RAIDDIAG™ switches off the power supply to the adapter. After a delay, RAIDDIAG™ switches the power supply back on to the adapter. Data integrity is verified to determine whether battery logic is functioning. Power cycling to the adapter through the raiser card is via an IO port of the host machine.

When power is removed from the adapter and then reapplied, the host operating system (e.g., DOS) has no knowledge about the power removal event. Configuration registers of RAID PCI adapters are reset and un-initialized. In order to bring the adapter out of this reset state, configuration registers need to be reinitialized. This is done by a host based diagnostic program RAIDDIAG™. The value of each register is system topology specific and varies from motherboard to motherboard design. Traditionally, a software programmer used to hardcode these values in the diagnostic program. This necessitated different versions of the diagnostic program for every combination of motherboard design and adapter topology.

Therefore, it would be desirable to provide a single diagnostic program that is able to verify the functionality of RAID and other kinds of host bus adapters in which the motherboards have different adapter topologies.

SUMMARY OF THE INVENTION

Accordingly, the present invention is directed to a method and system for validating a host bus adapter.

In the present invention, several method steps are employed. In general, the method steps are a snapshot of the configuration registers of select bus devices coupled to the host bus adapter, power cycling of the host bus adapter, and reinitialization of the configuration registers of the host bus adapter.

In a particular embodiment, the following steps are performed. All configuration registers of select PCI devices are read. The read values are stored in an .ini file. A data pattern is created in a controller adapter memory using proprietary command mailbox protocol. Power to the ADEX™ raiser card is switched off using a general purpose IO port (e.g., printer port). After a certain period of time to allow for a complete power down, power is switched back on for the ADEX™ raiser card using the general purpose IO port (e.g., printer port). The configuration registers of select PCI devices are loaded from the .ini file. All configuration registers of the select PCI devices are initialized from the loaded values. The data pattern in the controller adapter memory is verified using a proprietary command mailbox protocol. The adapter is passed or failed depending upon the result of the verification (i.e., data integrity test).

The present invention offers several advantages. The main advantage of this approach is a diagnostic program that has become very generic in nature. With the present invention, it is no longer necessary for software programs programmers to know a specific motherboard design. The present invention eliminates the need for redesigning the diagnostic program for adaptation to a different PCI or other bus topology. Any need to maintain a different version of diagnostic software for different motherboards is eliminated. Furthermore, support for new topologies can be added with minimal efforts.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
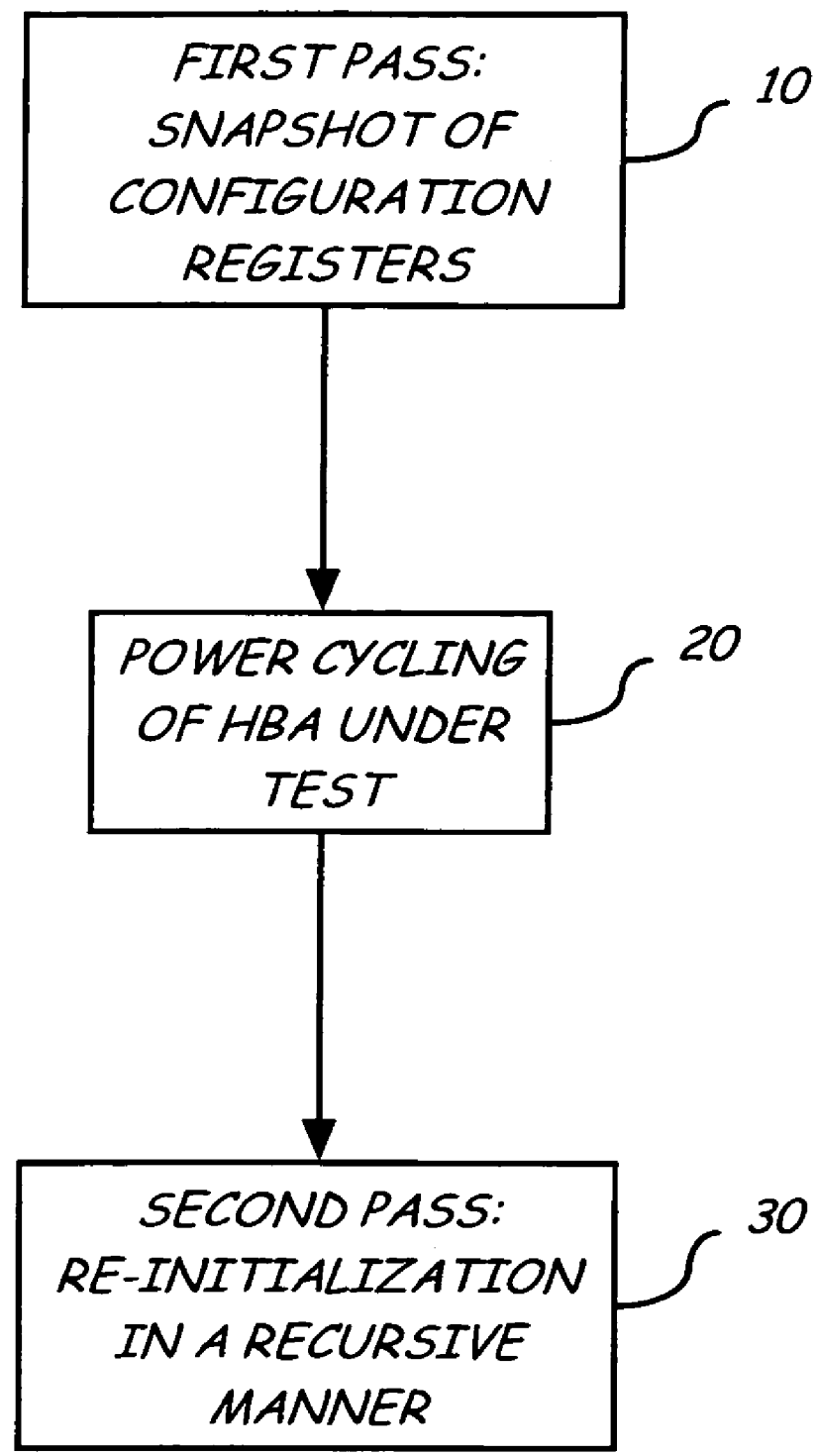
FIG. 1 illustrates an embodiment of the general method of the present invention.

Reference will now be made in detail to the presently preferred embodiments of the invention, examples of which are illustrated in the accompanying drawings. While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

The present invention relates to a method and system for validating a Peripheral Component Interconnect (PCI) host bus adapter, in particular, and to a bus adapter, in general. The present invention relates to a diagnostic program that is useable with plural motherboard designs and topology. This flexibility is achieved through the recording of configuration register content of the bus's peripheral devices.

As illustrated in FIG. 1, the diagnostic program dynamically identifies the register values to be re-initialized. In the first pass, the diagnostic utility takes a snapshot of configuration registers of select PCI devices and stores these values in host memory 10. In the second pass, after power cycling the host adapter under test 20, these values are re-initialized with the original stored values in a recursive manner 30. Thus, the diagnostic program is now independent of motherboard topology and the same binary can be used across multiple motherboard designs. If new PCI bridge or non-bridge PCI devices are used in the motherboard or adapter, then the diagnostic program needs to be altered but that change will be of minimal nature and involves adding the PCI IDs of these new devices to the list of select devices being stored by the diagnostic program.

Figure 2:
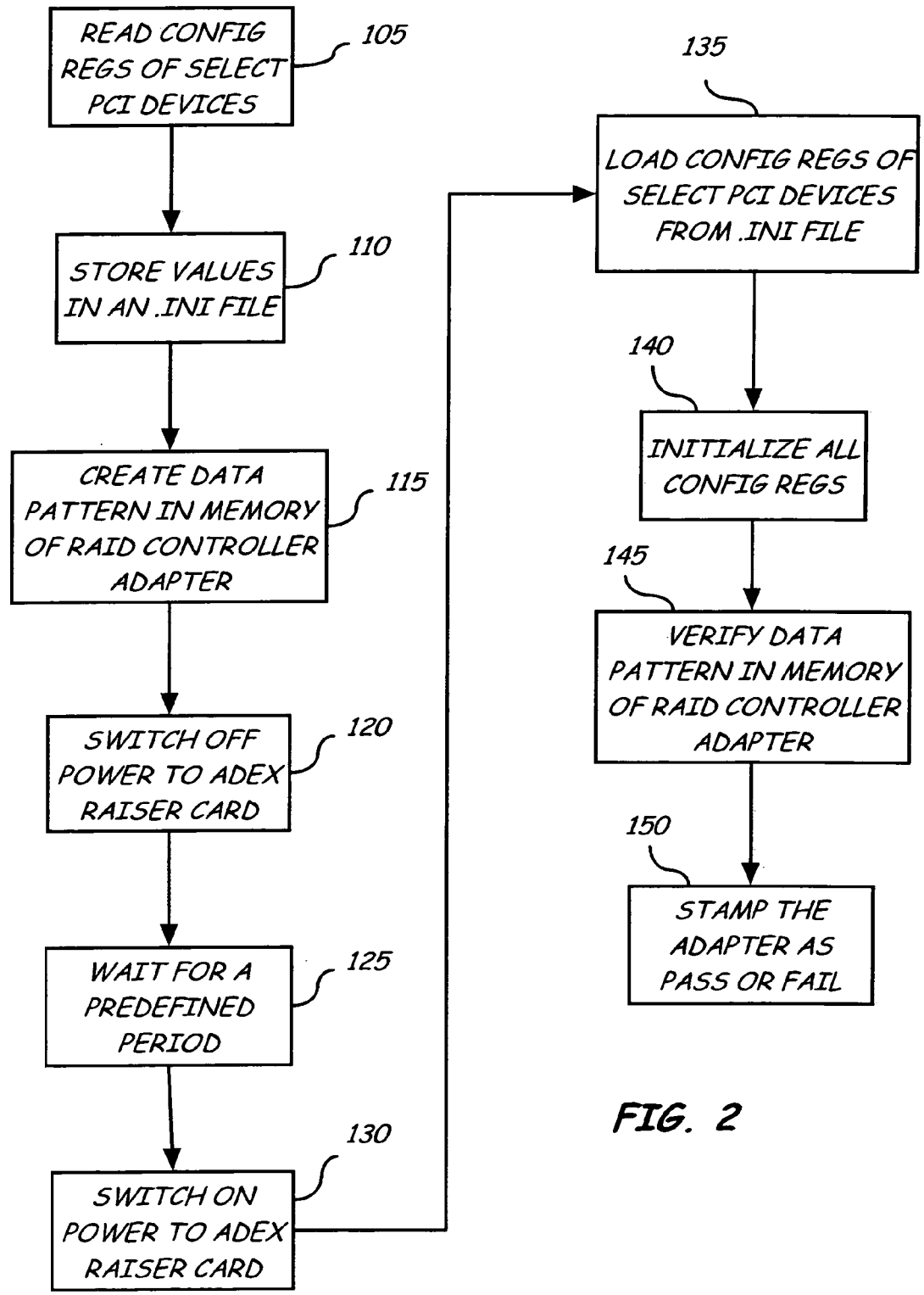
FIG. 2 illustrates an embodiment of a specific implementation of the method of the present invention.

FIG. 2 illustrates an embodiment of a specific implementation of the method of the present invention. All the configuration registers of select PCI devices are read 105. These values are stored in the .ini. file 110—.ini files contain configuration information for the operating system, such as MS-Windows, and certain application programs. A data pattern is created in memory of controller adapter using proprietary command mailbox protocol 115. Power to the ADEX™ raiser card is switched off using general purpose IO port 120 (e.g., a printer port). (The ADEX™ raiser card is an add-on card that provides electrical isolation and mechanical clearance in the motherboard.) The testing system automatically waits for a predefined period sufficient enough to test effectiveness of on-board battery logic (e.g., 10 seconds, 1 minute, 10 minutes, etc.) 125. Alternatively, an operator is prompted through a graphical user interface of a display to restart power to the ADEX™ raiser card. Power to ADEX™ raiser card is turned on again using the general purpose IO port 130. The configuration registers of select PCI devices are loaded from the .ini file 135. All configuration registers of the select PCI devices are reloaded from loaded values 140. A data pattern in the controller adapter memory is verified 145. According the verification process of step 145 (i.e., data integrity test), the host bus adapter is stamped as PASS or FAIL. The host bus adapter may be a RAID controller or other type of host bus adapter.

Figure 3:
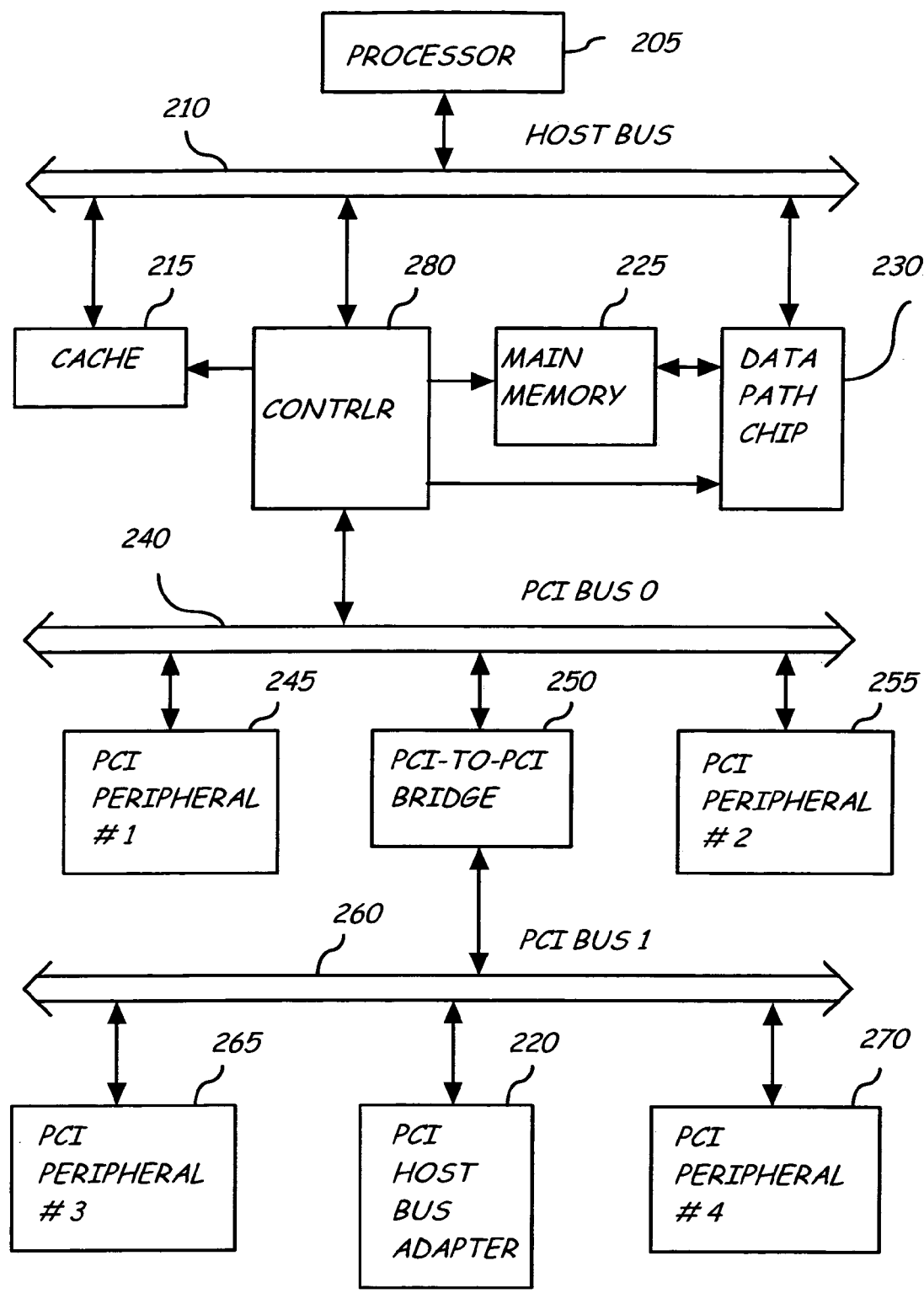
FIG. 3 illustrates a first embodiment of a system of the present invention.

The host bus adapter may be located in a variety of locations in a computer system. FIG. 3 illustrates an embodiment of the computer system which is suitable for incorporating various features of the present invention. The computer system includes a processor 205, a main memory 225, a cache memory 215, and a controller device 280. The computer system also includes (a) a host bus 210 that operatively couples the processor 205 to the cache memory 215, the host bus adapter 220, and the data path chip 230. The processor 205 fetches, decodes, and executes instructions, and also controls the transfer of data to and from the host bus adapter 220 and the main memory 225. In a preferred embodiment, the processor 205 is implemented with a general microprocessor such as the Intel Pentium processor. The main memory 225 stores data and/or instructions which may be fetched, decoded, and executed by the processor 205. An operating system runs on processor 205 and is used to coordinate and provide control of various components within the computer system. The operating system may be a commercially available operating system such as the Disk Operating System (DOS). Instructions for the operating system and applications or programs are located on storage devices, such as hard disk drive and may be loaded into main memory 225 for execution by processor 205.

Figure 4:
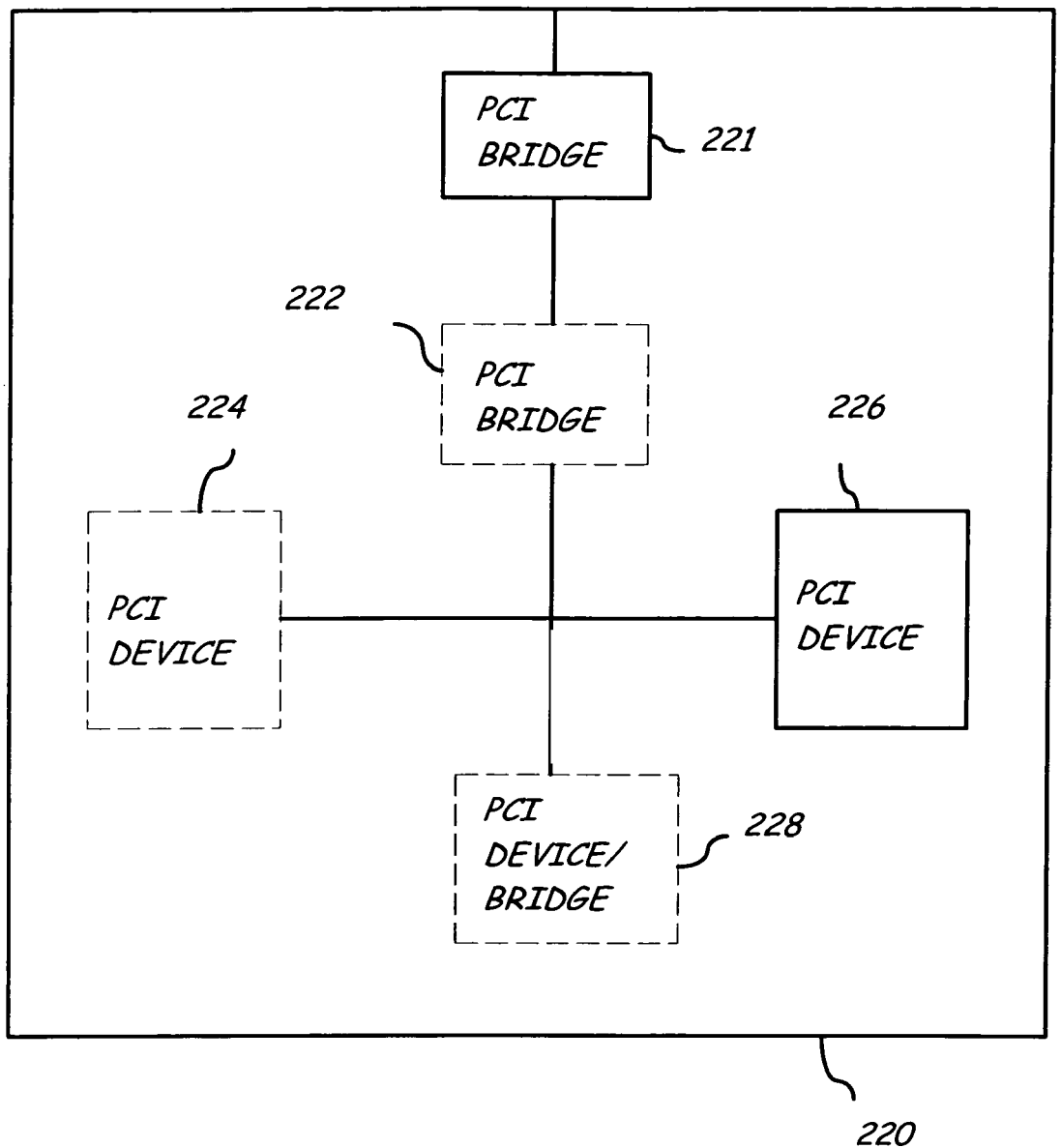
FIG. 4 illustrates an exemplary embodiment of a host bus adapter of the present invention.

Preferably, the host bus adapter 220 is a Peripheral Component Interconnect (PCI) host bus adapter. The PCI host bus adapter may be a PCI Extended (PCIX) or a PCI Express (PCIE) host bus adapter. Those of ordinary skill in the art will realize that other devices, such as, for example, a dual channel SCSI adapter or a SCSI/Ethernet adapter also may be attached to the computer system. A host bus adapter may contain one or more PCI bridges and one or more PCI devices. FIG. 4 shows an example of a PCI host bus adapter having a PCI bridge and a PCI device in solid lines. In FIG. 4, PCI bridges and devices drawn in the dashed lines are optional. Various other topologies of PCI bridges and devices may exist in a RAID or other controller. Peripheral device connections to PCI local bus 240 may be made through direct component interconnection or through add-in boards. Typical PCI local bus implementations will support three or four PCI expansion slots or add-in connectors. The peripheral devices 245, 255, 265, and 270 may be any peripheral device such as disk drives, tape drives, RAID devices, CD-ROM drives, printers, monitors, keyboard, modem, additional memory, optical drives CD-ROM drive, etc. As shown in FIG. 3, the processor 205 may access the peripheral devices 245, 255, 265, and 270 through the first and second PCI busses. First local PCI bus 240 is connected to host processor 205 by the controller device 280 and/or an interface device. In FIG. 3, first local PCI bus 240 has a PCI-to-PCI bridge 250 thereon which controls the second PCI bus 260. Multiple PCI-to-PCI bridges may be used. The present invention is applicable to all adapters that reside on PCI/PCIX/PCIE buses as long as there is battery back up circuitry.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A method for validating a Peripheral Component Interconnect (PCI) host bus adapter, comprising:
reading values of all configuration registers of select PCI devices;
storing the values in an .ini file;
creating a data pattern in memory of a Redundant Array of Inexpensive Disks (RAID) controller adapter using a command mailbox protocol;
switching off power to a raiser card using a general purpose input/output (IO) port;
waiting a predefined period of time;
switching on power to the raiser card using the general purpose IO port;
loading all the configuration registers of the select PCI devices with the values from the .ini file;
initializing all configuration registers of the select PCI devices from the loaded values; and
verifying the data pattern in the memory of the RAID controller adapter using the command mailbox protocol.

2. The method of claim 1, further comprising stamping the host bus adapter as one of the group consisting of PASS and FAIL depending on results from verifying the data pattern.

3. The method of claim 2, wherein the raiser card is an ADEX raiser card.

* * * * *